May 2, 1950  A. S. KING  2,506,088
MECHANICAL MOVEMENT FOR CRANK-DRIVEN ENGINES
Filed Dec. 18, 1945

INVENTOR.
Arthur S. King
BY
ATTORNEY.

Patented May 2, 1950

2,506,088

UNITED STATES PATENT OFFICE 2,506,088

MECHANICAL MOVEMENT FOR CRANK-DRIVEN ENGINES

Arthur S. King, Kansas City, Mo.

Application December 18, 1945, Serial No. 635,649

1 Claim. (Cl. 74—40)

This invention relates to mechanical movement for application to crank driven engines, in the nature of that disclosed in my United States Letters Patent No. 2,397,147, dated March 26, 1946.

The primary aim of this invention is the provision of structure for increasing the efficiency of internal combustion engines, which structure includes linkage between the connecting rod of the conventional reciprocating piston, and the crank shaft of the engine, which linkage is specially supported for the purpose of assisting the piston in rotating the crankshaft through the principle of leverage as the engine is functioning.

Another important aim of this invention is the provision of a mechanical movement for crank driven engines, the character whereof is such as to cause the piston of the engine to travel at a speed close to that sought for efficient operation and to further to cause the piston to move through a portion of its path of travel at a relatively greater speed than the speed attained by the piston as it moves through the remaining part of its path of travel.

A still further object of this invention includes the provision of a crank driven engine having simple, effective and rugged linkage forming a connection between the crankshaft of the engine and the connecting rod of the engine piston and so mounted on a swinging arm as to supplement the action of the piston on the crankshaft to impart force thereto as one end of the linkage oscillates through a path of travel of substantially 180°.

Figure 1:
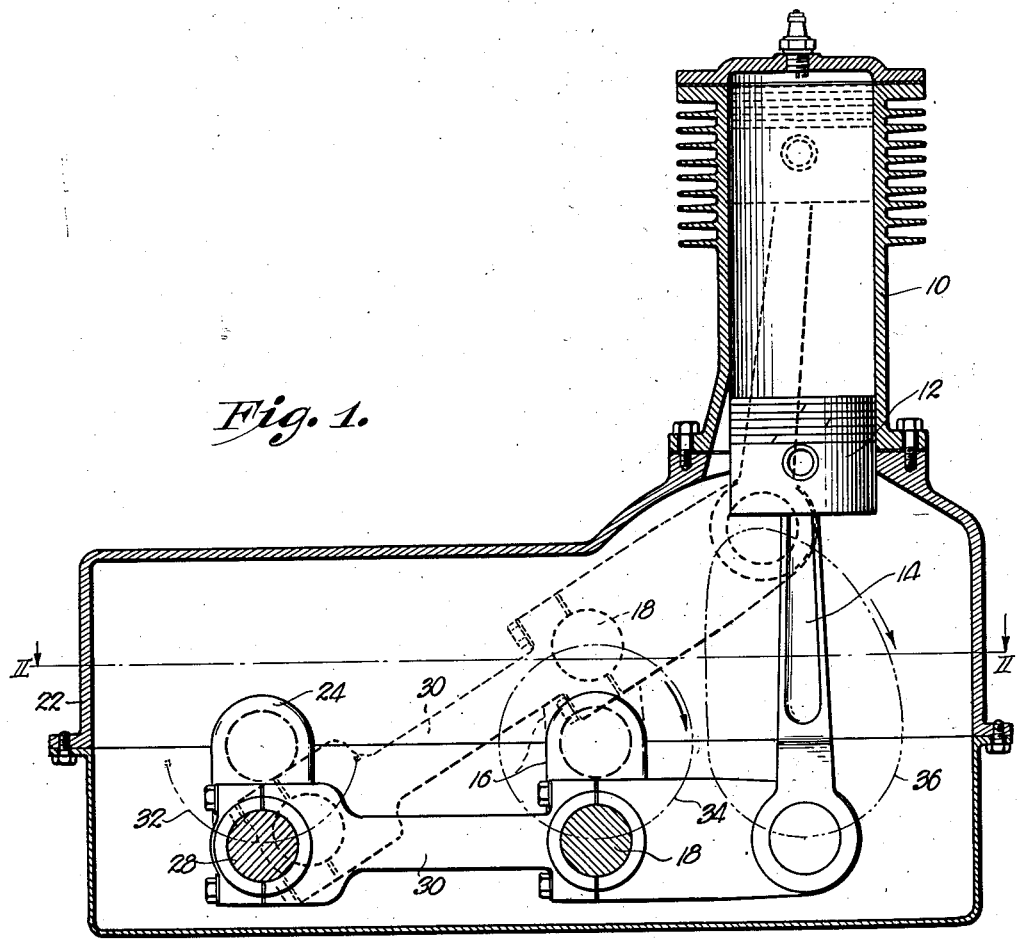
Figure 2:
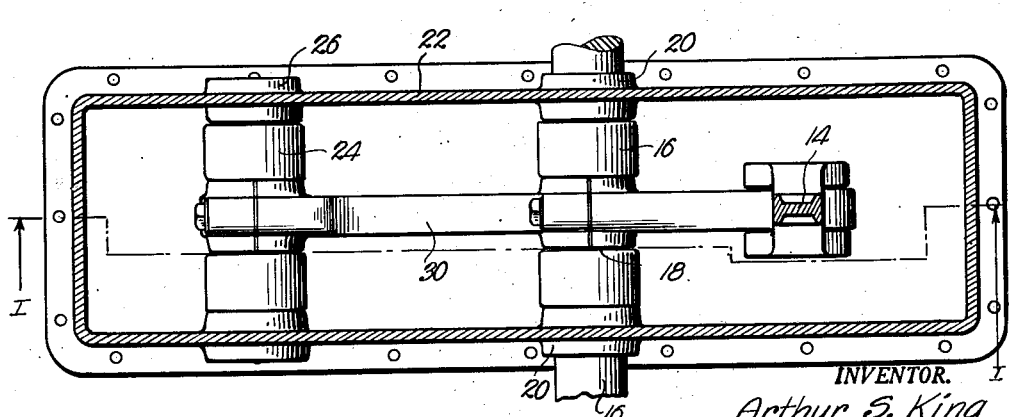

Other aims of the invention will appear during the course of the following specification, referring to the accompanying drawing, wherein:

Fig. 1 is a vertical cross sectional view through an internal combustion engine, having the mechanical movement made in accordance with this invention; and Fig. 2 is a cross sectional view taken on line II—II of Fig. 1.

Since the mechanical movement may be built into engines having any number of pistons, and further, in view of the fact that the invention is applicable to single piston units of such engines, but one set of operating parts will be described as they are shown in the drawing.

The numeral 10 designates a conventional cylinder wherein is reciprocably mounted a piston 12 joined to connecting rod 14 in the usual fashion.

A crank shaft 16 having an offset pin 18 is journalled in bearings 20 of engine block 22, and since this crankshaft may extend to each side of the unit illustrated, it is obvious that it may be joined to similar units as those being described, in order to impart more power to the crankshaft 16.

A swingable arm 24 pivotally mounted in suitable bearings 26 is substantially U-shaped with a pin 28 forming the bight thereof. This swingable arm 24 constitutes one of the major elements of the assembly comprising the mechanical movement, and has associated therewith, a link 30, one end whereof is joined to pin 28 while the other end is pivotally joined to connecting rod 14. Offset pin 18 of crankshaft 16 is pivotally joined to this link 30 intermediate its ends, and as the piston 12 reciprocates to and from the position shown in dotted lines of Fig. 1, link 30 also moves.

Link 30 is rectilinear in form and the axes of the three points of connection between the link 30 and connecting rod 14, crankshaft 16, and arm 24, are in alignment at all times.

As piston 12 moves as above set forth, arm 24 swings about the axis of its point of connection and support by bearings 26 and the axis of pin 28 moves through the path illustrated in Fig. 1, by the dot-and-dash line 32. The axis of offset pin 18 moves through a path of travel illustrated by the line 34, and the axis of the joint between one end of link 30 and one end of connecting rod 14, travels through the path illustrated by line 36. It is this substantially elliptical path of travel that is created due to the leverage established by link 30 as the engine is in operation. Piston 12 travels at a relatively great speed as it moves through the first major portion of the path of travel indicated by the line 36, and thereafter, the speed of travel is slower and at a rate of travel the same as though the crank shaft 16 and arm 24 were geared together, as is the situation in my patent above identified.

The end of link 30 joined to arm 24 never moves above a straight line extending between the axis of crank shaft 16 and the axis of oscillation of arm 24. In the instance illustrated, this said line is horizontally disposed, and because of the fact that the path of travel of pin 28 is substantially 180°, crank shaft 16 is assisted through its path of travel, indicated by the line 34, and the power imparted to this crank shaft 16 by piston 12 through connecting rod 14, is supplemented to a considerable degree.

The fact that piston 12 travels rectilinearly and substantially perpendicular to the axis of rotation of shaft 16 and to the axis of arm 24 in bearings 26, plus the fact that the distance between the connections of arm 30 to connecting rod 14 and pin 18 remains the same, causes such oscillation of arm 24.

Because of the form and relative dispositions of the points of connection between link 30 and parts 14, 16 and 24, the power of piston 12 is stepped-up appreciably as link 30 rocks about the center of pin 28 and as the entire assembly moves through paths designated by the numerals 32, 34 and 36.

In constructing the preferred form of the invention, it is desirable that the axis of piston 12 be to one side of a vertical plane passing longitudinally through the axis of rotation of crank shaft 16. The distance between this axis of crank shaft 16 and the axis of piston 12, is substantially the same as the distance between the points of connection between link 30 and crank shaft 16 and the connecting rod 14. Thus, when connecting rod 14 is in the position shown in Fig. 1, it is virtually at right angle or perpendicular to the major axis of link 30. The distance between the axis of the joint between connecting rod 14 and one end of link 30 and the axis of offset pin 18, may be more or less than the distance between this said axis of offset pin 18 and the axis of pin 28.

Actual tests of a working model made in precise accordance with the engine just described and illustrated herewith, indicates a high degree of efficiency due to the action of link 30. Relatively few parts are required in the mechanical movement, when made as just set down, and since some alterations might be made, it is desired to be limited only by the scope of the appended claim.

Having thus described the invention, what is claimed as new and desired to be secured by Letters Patent is:

In an engine having a crank shaft, including an offset pin, a reciprocating piston and a connecting rod for the piston; an arm swingably mounted adjacent to the crank shaft; and a link of fixed length joining the offset pin of the crank shaft, the free end of the arm and the connecting rod, the axes of connection between the link and the connecting rod, the link and the offset pin and the link and the swingable arm being in rectilinear alignment, said link being longer than the distance between the offset pin of the crank shaft and the arm and having the connecting rod pivotally joined to one end thereof, the arm being pivotally joined to the opposite end thereof and said offset pin being pivotally joined to the link at a point intermediate the ends of the latter, the distance between the axes of said pivotal joints being such as to cause the swingable member to oscillate through a half circular path of travel entirely to one side of a straight line passing through the axis of rotation of the arm and the crank shaft, the length of the path of travel of the pivotal joint between the arm and the link being substantially 180°, said link being perpendicular to said arm and to said connecting rod, and said arm and the connecting rod being parallel when the piston is at one end of its path of travel, all of said pivotal joints moving through the same respective path of travel during each cycle of operation.

ARTHUR S. KING.

REFERENCES CITED

The following references are of record in the file of this patent:

UNITED STATES PATENTS

| Number | Name | Date |
|---|---|---|
| 178,125 | Duecker | May 30, 1876 |
| 253,798 | Whitney | Feb. 14, 1882 |
| 292,573 | Pasfield | Jan. 29, 1884 |
| 308,653 | Clemson | Dec. 2, 1884 |
| 1,207,003 | Elliott | Dec. 5, 1916 |
| 2,005,000 | Miller | June 18, 1935 |